Dec. 14, 1937. W. D. HARVEY ET AL 2,102,459
COOK STOVE
Filed Feb. 27, 1936
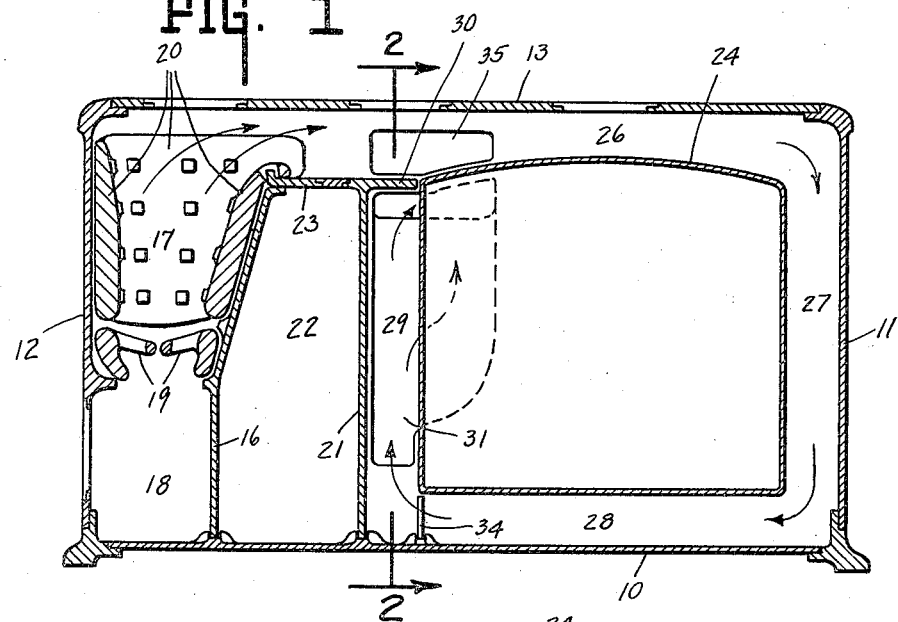
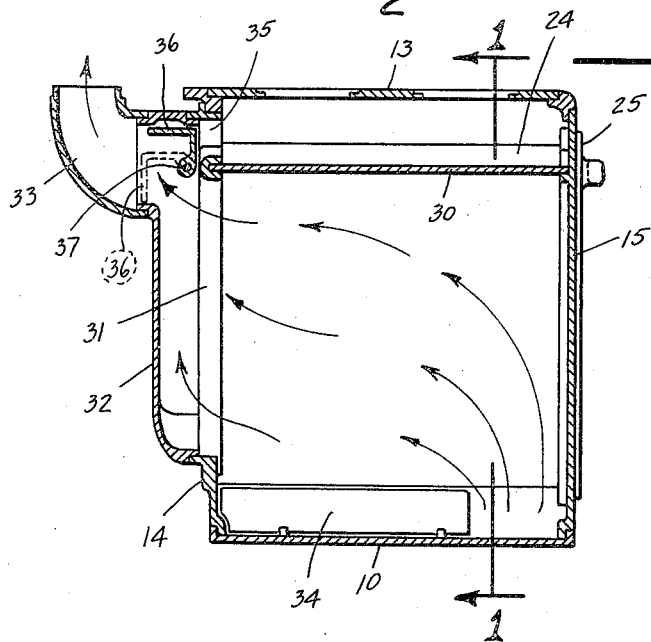
INVENTORS.
WILLIAM DOW HARVEY.
ALDEN P. CHESTER.
BY
Lockwood Goldsmith & Galt
ATTORNEYS.

Patented Dec. 14, 1937

2,102,459

UNITED STATES PATENT OFFICE 2,102,459

COOK STOVE

William Dow Harvey and Alden P. Chester Kokomo, Ind., assignors to Globe American Corporation, Kokomo, Ind., a corporation Application February 27, 1936, Serial No. 65,993

2 Claims. (Cl. 126—1)

This invention relates to a cook stove or range of the coal or wood burning type.

One object of the invention is to provide means for more efficiently and uniformly heating the oven and controlling the temperature thereof. To this end the oven is placed some distance from the firebox and means are provided for conducting the hot products of combustion completely about four sides of the oven and discharging the same to a flue at the rear of the stove. Preferably, the hot gases pass first over the top of the oven, then downwardly over the side remote from the firebox, then across the bottom of the oven and upwardly along the side nearest to the firebox to the flue. A warming chamber between the oven and firebox prevents direct application of the flames of the firebox to the oven itself and thus no part of the oven is subjected to the more intense heat of the flame. The oven is, therefore, heated with a high degree of uniformity.

To control the temperature of the oven, there is provided a by-pass permitting passage of the hot gases direct from the firebox to the flue without passing over any of the oven walls. The by-pass, when opened, prevents further rise in temperature of the oven. Together with the by-pass there are preferably provided means for preventing movement of hot gases about the oven operable when the by-pass has been opened. Such means preferably take the form of one or more dampers or similar devices operable to close off the flue from the gas passages surrounding the oven whenever the by-pass is opened. By this means, the circulation of hot air around the oven is stopped and the oven is surrounded by a blanket of dead air which serves as an efficient heat insulator and prevents the temperature of the oven from dropping undesirably fast. The oven may thus be heated to a desired temperature, the by-pass opened and circulation stopped, whereupon the temperature remains above the cooking temperature of the particular food in the oven for a sufficient time to perform many important cooking operations on the retained heat. Furthermore, when the temperature finally drops below the cooking point, the food stops cooking but remains hot enough to serve for several hours without drying up, burning or spoiling.

Other objects and features of the invention will be understood from the accompanying drawing and the following description and claims:

Fig. 1 is a vertical sectional view through a stove constructed in accordance with the invention, said view being taken substantially on the line 1—1 of Fig. 2. Fig. 2 is a similar section taken on the line 2—2 of Fig. 1.

The stove shown in the drawing, by way of illustration, is provided with a bottom plate 10, end plates 11 and 12, cooking plate 13, back plate 14 and front plate 15. These plates are all joined together in a conventional manner to form the rectangular outer structure of the stove. Within the structure so formed, there is provided a partition 16 forming with the plate 12 a chamber containing a firebox 17 and ash pit 18. Within the firebox there are provided the usual grates 19 and fire lining 20.

A second partition plate 21 extends from front to back of the stove and forms with the plate 16 a chamber 22 which may be provided with suitable shelves or trays to serve as a warming chamber. The top of the chamber 22 is closed by a plate 23 spaced from the cooking plate 13 to provide a passageway for flame and hot gases from the firebox.

An oven 24 is supported on the back plate 14 and front plate 15 and is completely closed except at the front of the stove where it is provided with a closure 25 in the form of the usual oven door.

The oven is spaced from the cooking plate 13, the end plate 11, bottom plate 10 and partition 21 to form passages 26, 27, 28, and 29, respectively, for the hot gases from the firebox, which thus have an opportunity to circulate completely around the oven. The upper end of the passage 29 is closed by a partition 30 extending from front to back of the stove.

The back plate 14 is provided with an opening 31 communicating with a duct 32 leading to a flue connection 33. A baffle 34 prevents the hot gases from short-circuiting to the rear of the oven bottom and thus maintains a more uniform distribution of the heat.

Above the partition 30 and a part of the oven, there is an opening 35 in the back plate 14 communicating with the duct 32. Said opening is provided with a closure 36 attached to a pivotally mounted rod 37. In the position shown in full lines in Fig. 2, the closure 36 prevents passage of the hot gases through the opening 35. Said gases must, therefore, circulate about the oven before reaching the flue 33 and serve to heat the oven. When the oven has reached its desired temperature, the closure 36 is moved to the broken line position of Fig. 2, in which position the passage 35 is opened but all communication between passage 29 and the flue 33 is cut off. The gases are then by-passed direct from the firebox to the flue and circulation about the oven is stopped. The by-passing of the gases, without coming into direct contact with the oven, prevents further heating thereof, while the trapping of a body of hot, dead air or gas in passages 26, 27, 28 and 29 acts as heat insulation and retards cooling. Thus, the oven may remain above cooking temperature without further manipulation of drafts or by-pass for an appreciable length of time.

While the foregoing specification describes a preferred form of the invention, the details thereof may be varied without departing from its scope as defined in the appended claims. For example, the closure 36 herein serves both for the by-pass and for the stoppage of circulation. An operable construction could be created by using separate dampers for the two functions, although the present construction is preferable.

The invention claimed is:

1. In a cook stove, the combination of a firebox, an oven, a warming chamber between the firebox and oven, and means spaced from the oven and forming passages conducting products of combustion from the firebox across the top of the oven, thence downwardly along the side of the oven remote from the firebox, thence across the bottom of the oven and thence upwardly along the side of the oven nearest the firebox between the oven and warming chamber.

2. In a cook stove, the combination of a firebox, an oven, a flue, a warming chamber between the firebox and oven, means spaced from the oven and forming passages conducting products of combustion from the firebox across the top of the oven, thence downwardly along the side of the oven remote from the firebox, thence across the bottom of the oven and thence upwardly along the side of the oven nearest the firebox between the oven and warming chamber to said flue, and means operable at will for by-passing said products of combustion to the flue without passing over the surfaces of the oven.

WILLIAM DOW HARVEY.
ALDEN P. CHESTER.